United States Patent
Smith et al.

(10) Patent No.: US 9,680,568 B2
(45) Date of Patent: Jun. 13, 2017

(54) METHOD AND APPARATUS FOR ALIEN DEVICE IDENTIFICATION IN PASSIVE OPTICAL NETWORKS

(71) Applicant: Alcatel-Lucent USA Inc., Murray Hill, NJ (US)

(72) Inventors: Joseph L. Smith, Faquay Varina, NC (US); Julia Ferguson, Raleigh, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 337 days.

(21) Appl. No.: 14/261,957

(22) Filed: Apr. 25, 2014

(65) Prior Publication Data
US 2014/0369681 A1 Dec. 18, 2014

Related U.S. Application Data

(60) Provisional application No. 61/834,508, filed on Jun. 13, 2013.

(51) Int. Cl.
- H04B 10/08 (2006.01)
- H04B 10/07 (2013.01)
- H04B 10/079 (2013.01)
- H04Q 11/00 (2006.01)

(52) U.S. Cl.
CPC ..... H04B 10/0705 (2013.01); H04B 10/0793 (2013.01); H04B 10/0795 (2013.01); H04Q 11/0067 (2013.01)

(58) Field of Classification Search
CPC .......... H04B 10/07953; H04B 10/0795; H04B 10/0705; H04B 10/0793; H04B 10/0799; H04B 10/07955; H04B 10/0773; H04B 10/0779; H04B 2210/08; H04Q 11/0067; H04Q 2011/0083; H04J 14/08; H04J 2203/0062; H04L 25/0298
USPC ......... 398/10, 15, 17, 25, 26, 27, 35, 36, 33
See application file for complete search history.

(56) References Cited

U.S. PATENT DOCUMENTS

| | | | | |
|---|---|---|---|---|
| 7,468,958 B2 * | 12/2008 | Emery | ................. | H04B 10/077 370/241 |
| 7,818,648 B2 * | 10/2010 | Haran | ................. | H04B 10/077 398/78 |
| 8,006,142 B2 * | 8/2011 | Haran | ................. | H04B 10/077 714/704 |

(Continued)

FOREIGN PATENT DOCUMENTS

EP 2058959 A1 5/2009
WO PCT/US2014/041651 9/2014

*Primary Examiner* — Hibret Woldekidan
(74) *Attorney, Agent, or Firm* — Stephen J. Wyse (57) ABSTRACT

A manner of detecting the presence of alien devices, for example ONUs, that are transmitting upstream in an optical access network such as a PON. An alien detection device, for example a properly configured OLT, supports normal network operation and also monitors a selected performance characteristic. When the selected performance characteristic is evaluated to perform within satisfactory parameters, a protocol that includes a command to subscriber devices such as ONUs to go quiet, for example a rogue check, is executed and a signal detector monitored during the quiet period. An alarm may be generated if an alien device appears to be present.

8 Claims, 4 Drawing Sheets

(56) References Cited

U.S. PATENT DOCUMENTS

| | | | | |
|---|---|---|---|---|
| 8,249,446 | B2* | 8/2012 | Smith | H04B 10/272 398/17 |
| 8,565,601 | B2* | 10/2013 | Nakura | H04B 10/272 398/140 |
| 8,768,163 | B2* | 7/2014 | Kim | H04Q 11/0067 398/33 |
| 8,842,990 | B2* | 9/2014 | Hood | H04Q 11/0067 398/63 |
| 9,071,349 | B2* | 6/2015 | El-Ahmadi | H04B 10/07 |
| 9,363,013 | B2* | 6/2016 | Khotimsky | H04Q 11/0067 |
| 9,496,952 | B2* | 11/2016 | Bernard | H04B 10/038 |
| 9,515,725 | B2* | 12/2016 | Bernard | H04B 10/038 |
| 2006/0093356 | A1* | 5/2006 | Vereen | H04L 12/2602 398/33 |
| 2007/0143645 | A1 | 6/2007 | Haran | |
| 2007/0274720 | A1* | 11/2007 | Menasco, Jr. | H04Q 11/0067 398/66 |
| 2009/0245781 | A1* | 10/2009 | Qi | H04J 3/1694 398/1 |
| 2010/0098413 | A1 | 4/2010 | Li et al. | |
| 2011/0033180 | A1* | 2/2011 | Smith | H04B 10/272 398/1 |
| 2011/0087925 | A1* | 4/2011 | Haran | H04B 10/077 714/37 |
| 2011/0255500 | A1* | 10/2011 | Cavalcanti | H04W 16/14 370/329 |
| 2013/0136445 | A1* | 5/2013 | El-Ahmadi | H04B 10/07 398/22 |
| 2014/0233940 | A1* | 8/2014 | Pitzer | H04B 10/03 398/8 |

* cited by examiner

METHOD AND APPARATUS FOR ALIEN DEVICE IDENTIFICATION IN PASSIVE OPTICAL NETWORKS

CROSS-REFERENCE TO RELATED APPLICATIONS

The present disclosure is related to and claims priority from U.S. Provisional Patent Application Ser. No. 61/834,508, entitled Alien Wavelength Identification on PONs and filed on 13 Jun. 2013, the entire contents of which are incorporated by reference herein.

TECHNICAL FIELD

The present invention relates generally to the field of communication networks and, more particularly, to a method and apparatus for identifying the presence of alien devices in PONs (passive optical networks).

BACKGROUND

The following abbreviations are herewith expanded, at least some of which are referred to within the following description of the state-of-the-art and the present invention.
AD Alien Detection
CO Central Office
GPON Gigabit PON
OLT Optical Line Terminal
ONT Optical Network Terminal
ONU Optical Network Unit
PON Passive Optical Network A PON (passive optical network) may be used as an access network, connecting individual subscribers or groups of subscribers to a core telecommunications network. A typical PON includes, among other components, an OLT (optical line terminal) in a CO (central office) and a number of ONUs (optical network units) at subscriber premises (or some intermediate location). Many residential houses, for example, have an ONU that communicates with an OLT over a FTTH (fiber to the home) PON access network. The network may make available to the subscriber services such as Internet access, telephone, and television.

As may be apparent, an OLT in the CO is a relatively permanent part of the PON; at least it typically remains in place for some time serving the various ONUs connected to it. Each ONU, however, is generally in place only so long as the subscriber subscribes to the services provided via the PON. Even where subscribers buy the ONU equipment, it will typically become inoperative as part of the network when then subscription is terminated. New subscribers, on the other hand, acquire or are provided with ONUs for use with the PON. An ONU may in some cases move from one location to another, but cannot be used there unless it is compatible with the PON, which frequently it will not be. In any case, when a properly configured ONU is in place and a subscription begins, the ONU may be linked (registered) with the OLT and service provided.

In some environments, PON providers supply all necessary equipment to the subscriber, including the ONU; the provider may even install the ONU and ensure it is working. In other environments, subscribers may purchase and install their own equipment. In the latter case, it is possible in some cases, for example open access environment with multiple operators, an ONU may be connected to the wrong PON. This may occur, for instance, in a multi-subscriber dwelling where many subscribers may be connected to a number of different providers. Additionally, other optical systems, such as Point-to-Point may also share the same fiber infrastructure and also act to disrupt the PON system on the same fiber. Generally, an ONU connected to the wrong operator's PON or fiber will not be able to link with the OLT and no service will be provided to it.

Unfortunately, this "alien ONU" (or other alien device) can still disrupt PON operations. While upstream transmissions from the alien ONU typically do not detectably affect performance characteristics during regular PON operation, they are frequently sufficient to frustrate ranging procedures. When this occurs, legitimate PON ONUs are frequently unable to link with the OLT, either initially or when being brought back on line. These circumstances, however, make the presence of alien ONUs very difficult to detect.

Accordingly, there has been and still is a need to address the aforementioned shortcomings and other shortcomings associated with alien ONUs. These needs and other needs are satisfied by the present invention.

SUMMARY

The present invention in a preferred embodiment is directed to a manner of detecting the presence of alien devices, for example ONUs, that are transmitting upstream in an optical access network such as a PON. In one aspect, the present invention is method of alien device identification in an optical access network that includes monitoring at least one network performance metric, for example BER, determining whether at least one network performance metric is within an acceptable range, executing a protocol that includes a command to quiet network ONUs subsequent to determining that the at least one network performance metric is within an acceptable range, and determining whether an optical signal detector is active during execution of the protocol. In a preferred embodiment the protocol is a rogue check.

In some embodiments, the method may be performed by an OLT of a PON. In others, the method may be performed by a portable or fixed device that may be placed into communication with the PON.

In some embodiment, an AD timer may be present, and the method may include the step of setting the AD timer. The timer may be used to determine when to execute the protocol or when to determine that the at least one network performance metric is within an acceptable range.

In some embodiments the method may further include generating an alarm if it is determined that the optical signal detector is active during execution of the protocol.

In another aspect, the present invention is an apparatus for identifying the presence of devices alien to an optical access network, including a performance monitor configured to monitor network to measure performance relating to at least one performance characteristic, for example BER, a performance evaluator configured to determine whether the at least one performance measurement is within acceptable parameters, an AD (alien detection) timer, a protocol module configured to execute a protocol, for example a rogue check, comprising a command to silence subscriber devices registered in the optical access network, a network interface comprising a signal detector for determining when a device is transmitting upstream on the network, and a processor for controlling operation of the apparatus. The apparatus may also include a memory device in communication with the processor for storing software program instructions.

In some embodiments, the apparatus may include an alarm generator for generating an indication that an alien device may be present on the network.

In some embodiments, the apparatus may be an OLT of a PON. In others, the method may be performed by a portable or fixed device that may be placed into communication with the PON.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of detecting the presence of alien devices, for example ONUs, that are transmitting upstream in an optical access network such as a PON. Note that these transmissions will sometimes be referred to herein as alien wavelengths or alien signals. Note also that the present invention does not require that all such ONUs are discovered, or that the location or connection point of any alien ONU be determined, unless explicitly recited in a particular embodiment. Briefly described above, a PON for implementing the present invention will now be described in more detail.

Figure 1:
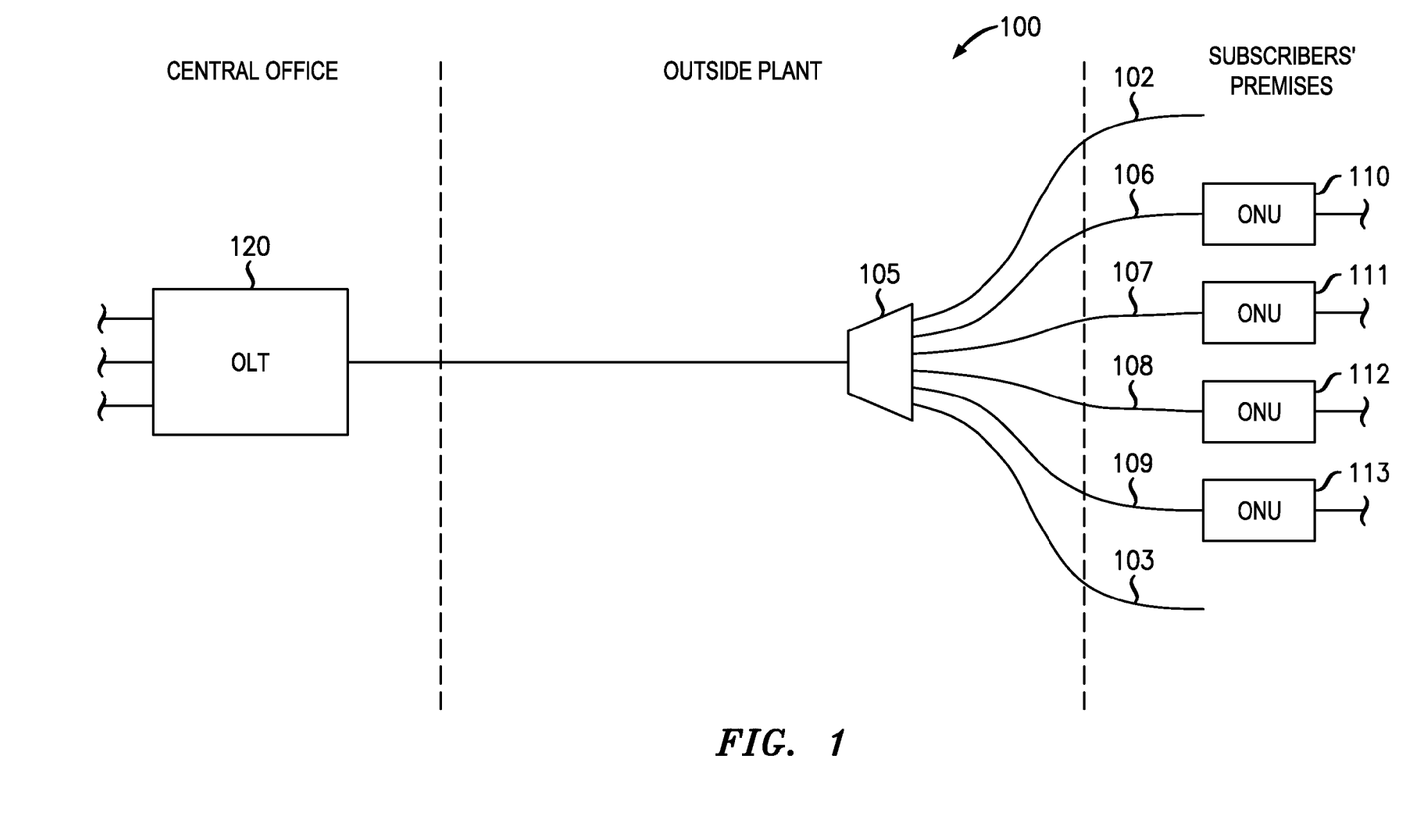
FIG. 1 is a schematic diagram illustrating selected components of an exemplary PON in which embodiments of the present invention may be advantageously implemented.

FIG. 1 is schematic diagram illustrating selected components of a PON 100 in which embodiments of the present invention may be advantageously implemented. Note that PON 100 may, and in many implementations will, include additional components, and the configuration shown in FIG. 1 is intended to be exemplary rather than limiting. Four ONUs, 110 through 113, are shown, although in a typical PON there may be many more or, in some cases, fewer. In this illustration, each of the ONUs are presumed to be located at and serving a different subscriber, perhaps at their respective residences or other premises. The ONU at each location is connected or connectable to a device of the subscriber, or to a network of such devices (not shown).

PON 100 also includes an OLT 120, which communicates directly or indirectly with various sources of content and network-accessible services (not shown) that are or may be made available to the subscribers associated with PON 100. As should be apparent, OLT 120 handles the communications between these other entities and the ONUs. OLT 120 may also be involved in regulating the PON and individual ONUs. As mentioned above, the OLT 120 is typically located at a service provider location referred to as a central office. The central office may house multiple OLTs (not separately shown), each managing their own respective PON.

OLT 120 is in at least optical communication with each of the ONUs in the PON 100. In the embodiment of FIG. 1, OLT is connected with the ONUs 110 through 113 via a fiber optic cable 101 and fiber optic cables 106 through 109. In this PON, a single splitter 105 is used to distribute a downstream transmission so that each ONU receives the same downstream signal. In other optical networks, the splitter may also separate the signal into different wavelengths, if used, associated with each or various of the respective ONUs. The splitter in a PON is typically a passive element requiring no power. The splitter may also serve as a combiner for combining upstream traffic from the ONUs to the OLT. The splitter may be located, for example, in a street-side cabinet near the subscribers it serves (FIG. 1 is not necessarily to scale). This cabinet or similar structure may be referred to as the outside plant. Note, however, that no particular network configuration is a requirement of the present invention unless explicitly stated or apparent from the context.

Also illustrated in FIG. 1 are fiber optic cables 102 and 103, which are also connected to optical splitter 105 and which may in the future be connected to ONUs (not shown) yet to be installed. With some network providers, this installation is closely monitored and only certain equipment is used. In other implementations, the subscriber or another contractor may simply purchase an ONU and install it themselves, for example by connecting to one of fiber optic cables 102 or 103.

In many if not most cases of subscriber-installed ONUs, a properly configured device is acquired and set up in accordance with the provider's requirements. When an improperly configured ONU (not shown) is used, however, it may begin transmitting alien signals upstream. As alluded to above, this may be hard to identify but disruptive to network operations. Application of the present invention to PON 100 can help to identify the presence of these alien devices so that remedial action may be undertaken. In order to do this, OLT 120 is in a preferred embodiment configured for alien wavelength detection as more specifically described in reference to FIG. 2.

Figure 2:
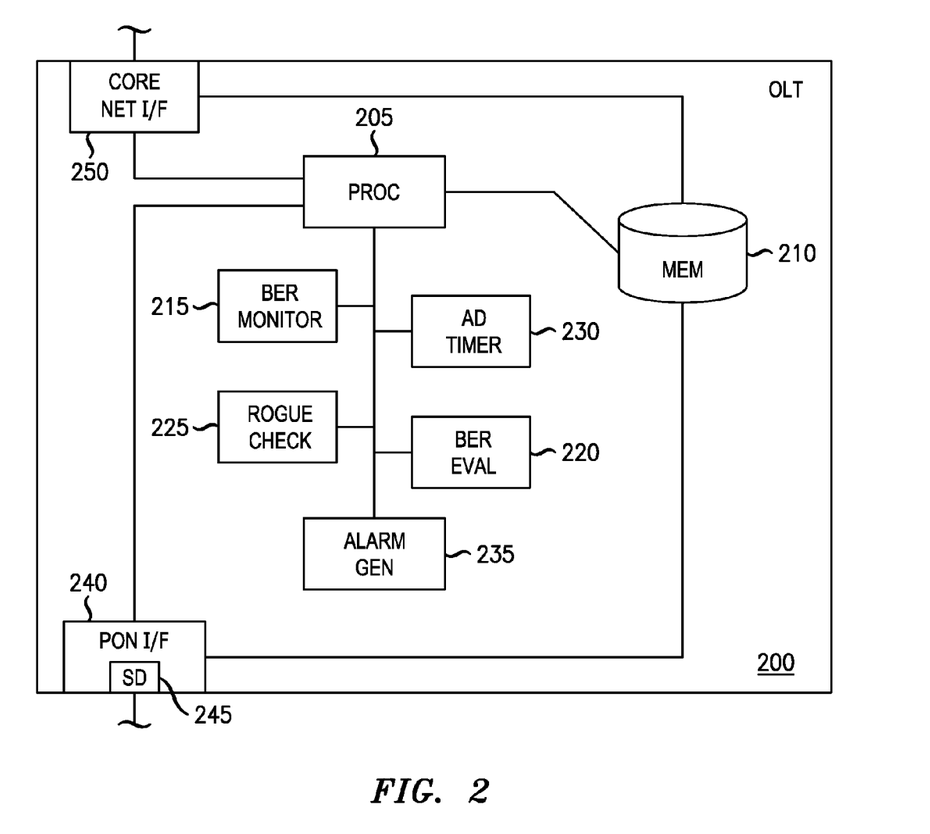
FIG. 2 is a simplified block diagram illustrating selected components of an OLT according to an embodiment of the present invention.

FIG. 2 is a simplified block diagram illustrating selected components of an OLT 200 according to an embodiment of the present invention. In this embodiment, OLT 200 includes a processor 205 and a memory device 210. Processor 205 may be implemented in hardware or program instructions executing on a hardware device, or both. Memory device 210 in this embodiment is a physical storage device that may in some cases operate according to stored program instructions. In any case, memory 210 is non-transitory in the sense of not being merely a propagating signal unless explicitly recited to the contrary in a particular embodiment. Memory 210 is used for storing, among other things, data and stored program instructions for execution by processor 205.

In the embodiment of FIG. 2, OLT 200 also includes a BER monitor 215 for monitoring BER performance in the PON, and a BER evaluator 220 configured to determine whether the BER falls within a defined acceptable range. Although BER is used here, in other embodiments other performance characteristics may be used, and in some cases more than one may be used in concert. Rogue check module 225 for running a rogue check or similar protocol when required (see, for example, FIGS. 3 and 4, described below). An AD timer 230 in this embodiment governs when the rogue check or similar protocol will be run in accordance with the present invention. An alarm generator 235 generates alarms reporting or calling to the operator's attention conditions in which an alien device may be present.

In the embodiment of FIG. 2, OLT 200 also includes a PON interface 240, through which OLT 200 communicates with various subscriber devices (see, for example, FIG. 1). PON interface 240 includes a signal detector 245 for detecting upstream signals, which in this embodiment resides in the OLT but in other implementations could reside elsewhere. In the OLT of course it may be used for receiving any or all upstream communications and not simply those associated with the alien detection procedure. OLT 200 also includes a core network interface 250 for communicating with a core network.

Note again that FIG. 2 illustrates selected components of an embodiment of the present invention and some variations are possible without departing from the claims of the invention as there recited. In some of these embodiments, illustrated components may be integrated with each other or divided into subcomponents. There will often be additional components in the device management server and in some cases less. The illustrated components may also perform other functions in addition to those described above. The components may be implemented as a physical device or devices and may execute instructions stored as software in a non-transitory medium, for example memory 210. In addition, the some or all of the components described may reside outside of an OLT, for example in the outside plant if it is equipped for such operation, or in a portable device that may be placed in communication with the PON.

Figure 3:
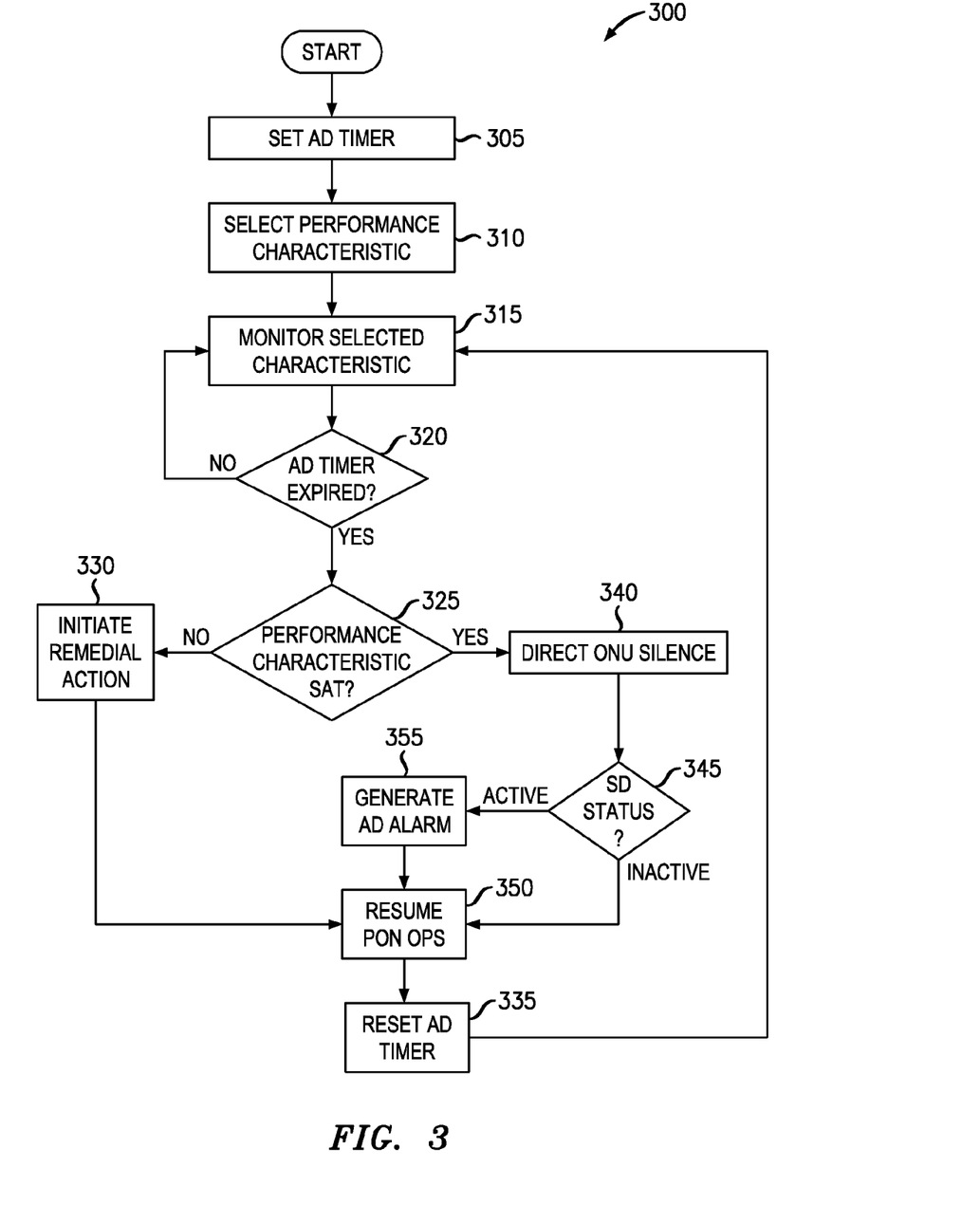
FIG. 3 is a flow diagram illustrating a method of alien ONU detection according to an embodiment of the present invention.

FIG. 3 is a flow diagram illustrating a method 300 of alien ONU detection according to an embodiment of the present invention. At START it is presumed that the necessary components are available and operational according to at least this embodiment. In most embodiments, these components will be present in the OLT of the PON. The process then begins when an AD (alien detection) timer is initialized (step 305). Once set, the timer will expire after a time that is pre-set or otherwise determined by the network operator. In some embodiments, the duration of the AD timers will vary according to a programmed schedule, for example having a shorter duration at first, but a longer duration later as trouble-free experience accumulates. As another example, a PON experiencing many problems with alien devices may use AD timer durations that shorten when an alien wavelength is detected.

In the embodiment of FIG. 3, a performance characteristic is then selected (step 310). The performance characteristic may be one that is normally monitored in a PON, such as BER (bit error rate) performance (see also FIG. 4). Other performance characteristics may be used, but it is preferable to select one that is normally unaffected (or alternately, predictably affected) by the presence of an alien signal). In some implementations, the selection is made prior to network operations and may be the only selection available for the performance of this method. The selected performance characteristic is then monitored (step 315), which may include initiating monitoring or simply the continuation of an existing monitoring regime.

In the embodiment of FIG. 3, a determination is made as to the status of the AD timer (step 320). If the timer has not expired, then monitoring of the selected performance characteristic continues at step 315. If, on the other hand, it is determined at step 320 that the AD timer has expired, then a determination is made (step 325) as to whether the monitored performance characteristic is performing within an acceptable range. This acceptable range may be determined, for example, by the network operator. The acceptable range may be static or vary over time.

In this embodiment, if the performance characteristic is not within acceptable parameters, then remedial action may be initiated (step 330) as dictated by normal procedures for dealing with the non-standard (unacceptable) performance. For example, if the BER performance characteristic is out of acceptable parameters, a rogue check may be performed in an effort to ascertain whether a rogue ONU appears to be operating. A rogue ONU is one that is linked with the ONU and forms part of the PON, but for some reason is sending upstream transmissions outside of its scheduled time slots. The rogue operation of an ONU will normally degrade BER performance. Of course, if any remedial action has already been initiated, this step 330 may be omitted. In either case, the PON is returned to normal operations (step 350), the AD timer is reset (step 335), and the process continues with monitoring the selected performance characteristic at step 315.

In the embodiment of FIG. 3, if, on the other hand, the determination at step 325 indicates the selected performance characteristic is within acceptable parameters, then the ONUs of the PON are directed to a silent state (step 340). That is, a quiet time is created where no upstream transmissions are scheduled. This may, for example, be done by running a rogue check or some other similar procedure.

In this embodiment, the status of an upstream signal detector is then determined (step 345). As in the embodiment of FIG. 2, described above, the signal detector used in this process is preferably located in the OLT. If the signal detector is inactive, then the PON is returned to normal operation (step 350), the AD timer is reset (step 335), and the process returns to monitoring the selected performance characteristic at step 315.

In the embodiment of FIG. 3, if, on the other hand, the signal detector is active, then an alarm is generated (step 355) indicating the possibility that an alien device has been physically connected (but not registered or linked) to the PON. The alarm may take a number forms, such as one or more of generating a report for transmission to the network operator, actuating an indicator such as LED or audio signal, or simply creating a database record.

In this embodiment, then the PON is returned to normal operation (step 350), the AD timer is reset (step 335), and the process returns to monitoring the selected performance characteristic at step 315.

Note that in some cases it may be desirable to not perform the alien detection too frequently, and this can be addressed by assigned a longer duration to the AD timer, or simply bypassing or delaying the reset step 335 (not shown in FIG. 3), at least temporarily. A delay may be prudent, for example, when remedial action is being taken, or to avoid silencing the ONUs unduly when no problems have been detected for some time.

Figure 4:
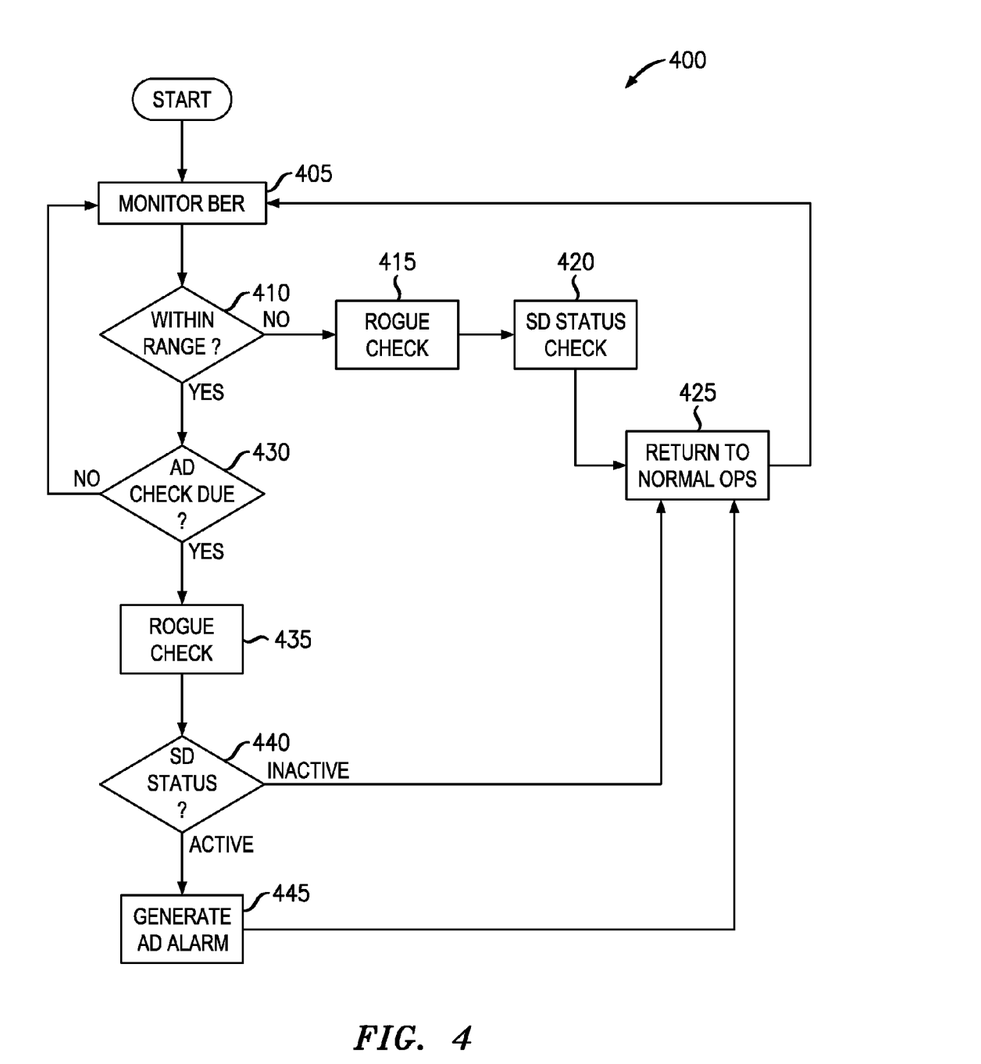
FIG. 4 is a flow diagram illustrating a method of alien ONU detection according to another embodiment of the present invention.

FIG. 4 is a flow diagram illustrating a method 400 of alien ONU detection according to another embodiment of the present invention. At START it is presumed that the necessary components are available and operational according to at least this embodiment. The process then begins with monitoring BER performance (step 405) for upstream transmissions from the ONUs. This monitoring is normally thought not necessarily performed in the OLT. The measured BER is then compared to an acceptable range (step 410) to see if it is within satisfactory limits Note that this monitoring may be done continuously or almost continuously, at periodic intervals, or when triggered by a command from the network operator or some other event.

In the embodiment of FIG. 4, if the BER is not within satisfactory limits, a rogue check or similar procedure is performed (step 415). As alluded to above, during a rogue check, the OLT directs that there be no upstream transmissions from ONUs in the PON at all. Note that a rogue ONU may or may not cease its transmissions. A signal detector in place in the PON can determine (step 420) whether upstream transmissions are occurring even during the quiet period enforced as part of the rogue check. In general, if the signal detector is inactive during the rogue-check quiet period, it may be assumed that the BER degradation was caused by a rogue ONU and appropriate action or further analysis may be undertaken (not shown in FIG. 4) before the PON is returned to normal operation at step 425.

In this embodiment, if on the other hand the determination at step 420 indicates that the signal detector is active during the rogue-check quiet period initiated at step 415, in general it may be surmised that an alien device may be present, although this is not necessarily the case. Another possibility, of course, is that a rogue ONU is operating but has not responded to the direction to cease upstream transmissions. In this case, unfortunately, the action or further analysis undertaken (not shown in FIG. 4) will have to focus on both possible scenarios, either in parallel or serially, until the true cause is discovered.

In the embodiment of FIG. 4, unless it is delayed by remediation or other considerations, the PON then resumes normal operation (step 425) and the process continues at step 405, BER monitoring. In this context, normal operation implies that the ONUs will be again permitted to make upstream transmissions. This may occur as part of the rogue check procedure or require a separate command from the OLT. In either case normal operation may also be frustrated by alien or rogue operation and no implication is made here that operability at this point is required by the present invention.

According to the embodiment of FIG. 4, if the BER at step 410 is determined to be within satisfactory limits, then a determination (step 430) is made as to whether an alien detection check should be made. In some cases this will be determined by the state of a time (see FIG. 3) though other protocols may be used. In some implementations a set schedule may be referred to, in others the schedule may vary according to an established algorithm, for example as a function of how many or how frequently alien devices have been discovered on the PON in question. In still other implementations, the network operator may set a flag or use a similar device to initiate the alien detection procedure at whenever the determination at step 430 is to be made.

In the embodiment of FIG. 4, if the determination at step 430 is that an alien detection procedure should be executed, then a rogue check is performed (step 435). A signal detector in place in the PON then determines (step 440) whether upstream transmissions are occurring even during the quiet period enforced as part of the rogue check. In general, if the signal detector is inactive during the rogue-check quiet period initiated at step 435, it may be presumed that no alien device is present. Again, there may be exceptions and the invention does not require that the presence of all alien devices is discoverable in this manner. At this point the PON then resumes normal operation (step 425) and the process continues at step 405, BER monitoring.

In this embodiment, if on the other hand the determination at step 420 indicates that the signal detector is active during the rogue-check quiet period initiated at step 435, in general it may be surmised that an alien device may be present. In most cases the absence of a rogue ONU may be inferred from the circumstance that the rogue check of step 435 was initiated while the BER performance of the PON was within acceptable parameters. An alarm is then generated (step 445) indicating the possibility that an alien device has been physically connected (but not registered or linked) to the PON.

As in the embodiment of FIG. 3, the alarm generated at step 445 may take a number forms, such as one or more of generating a report for transmission to the network operator, actuating an indicator such as LED or audio signal, or simply creating a database record. An "alarm" as used herein should be broadly construed to infer the creation of any communication or state that may be used to initiate remedial action or further diagnostics to address the possibility of the presence of an alien ONU or other device make unauthorized upstream transmission on the PON. In the embodiment of FIG. 4, the PON is then returned to normal operation (step 425) and the process returns to monitoring the BER at step 405.

Note that the sequences of operation illustrated in FIGS. 3 and 4 represent exemplary embodiments; some variation is possible within the spirit of the invention. For example, additional operations may be added to those shown in FIG. 3 or 4, and in some implementations one or more of the illustrated operations may be omitted. In addition, the operations of the respective methods may be performed in any logically-consistent order unless a definite sequence is recited in a particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. Apparatus for identifying the presence of devices alien to an optical access network, comprising:
   a performance monitor configured to monitor network to measure performance relating to at least one performance characteristic;
   a performance evaluator configured to determine whether the at least one performance measurement is within acceptable parameters;
   an AD (alien detection) timer;
   a protocol module configured to execute a protocol comprising a command to quiet subscriber devices registered in the optical access network if the AD timer has expired and subsequent to determining that the at least one performance measurement is within acceptable parameters;
   a network interface comprising a signal detector for determining when a device is transmitting upstream on the network; and
   a processor for controlling operation of the apparatus.

2. The apparatus of claim 1, further comprising a memory in communication with the processor for storing software program instructions.

3. The apparatus of claim 1, further comprising an alarm generator for generating an indication that an alien device may be present on the network.

4. The apparatus of claim 1, wherein the at least one performance characteristic is BER.

5. The apparatus of claim 1, wherein the protocol module is a rogue check module.

6. The apparatus of claim 1, wherein the optical access network is a PON and the apparatus is an OLT.

7. The apparatus of claim 1, wherein the apparatus is a portable device.

8. The apparatus of claim 1, wherein the performance evaluator is further configured to determine whether the at least one performance measurement is within acceptable parameters only if the AD timer has expired.

* * * * *